US012655342B1

(12) United States Patent
Al-Jawad et al.

(10) Patent No.: US 12,655,342 B1
(45) Date of Patent: Jun. 16, 2026

(54) METHOD OF IMPROVING ROCK HARDNESS IN SUBTERRANEAN GEOLOGIC FORMATION BY TRIPOTASSIUM PHOSPHATE

(71) Applicant: King Fahd University of Petroleum and Minerals, Dhahran (SA)

(72) Inventors: Murtada Saleh Hassan Al-Jawad, Dhahran (SA); Ali Abdullah Muslim Al-Taq, Qatif (SA); Mohammed Majed Matouq Almutawa, Saihat (SA); Mustafa Al Ramadan, Saihat (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/374,872

(22) Filed: Oct. 30, 2025

Related U.S. Application Data

(60) Provisional application No. 63/775,103, filed on Mar. 20, 2025.

(51) Int. Cl.
 *C09K 8/80* (2006.01)
 *C09K 8/66* (2006.01)
(52) U.S. Cl.
 CPC ............... *C09K 8/80* (2013.01); *C09K 8/665* (2013.01)
(58) Field of Classification Search
 CPC . C09K 8/68; C09K 8/685; C09K 8/70; C09K 8/665; C09K 8/80; E21B 33/13; E21B 43/267; E21B 43/26
 See application file for complete search history.

(56) References Cited

U.S. PATENT DOCUMENTS 12,071,590 B2 8/2024 Samarkin et al.
2024/0384638 A1* 11/2024 Desouky ................ E21B 43/27

FOREIGN PATENT DOCUMENTS

CA 2858512 A1 * 6/2013 ............. C09K 8/665
CN 118167373 B 9/2024

OTHER PUBLICATIONS

English translation of JP 4346331. (Year: 2009).*

(Continued)

*Primary Examiner* — Zakiya W Bates
(74) *Attorney, Agent, or Firm* — Oblon, McClelland, Maier & Neustadt, L.L.P.

(57) ABSTRACT

A method of improving rock hardness in a subterranean geologic formation includes injecting a solution including a phosphate salt through a borehole into the subterranean geologic formation at a temperature of 50-90° C. and a pressure of 600-2000 psi, wherein the solution has a pH of 4 to 14 and a phosphate concentration of 0.5-2 mol/L, and the phosphate salt includes $PO_4^{3-}$, followed by saturating rocks in the subterranean geologic formation with the solution for a duration of 1-24 hours, wherein the rocks include Austin chalk (AC), Indiana limestone (IL) or both. The method then includes injecting a liquid fractionating composition through the borehole into the subterranean geologic formation at a pressure of at least 1,000 psi to fracture the rocks in the subterranean geologic formation.

20 Claims, 4 Drawing Sheets

50

Inject a solution including a phosphate salt through a borehole into the subterranean geologic formation at a temperature of 50°-90 °C and a pressure of 600-2000 psi, wherein the solution has a pH of 4 to 14 and a phosphate concentration of 0.5-2 mol/L, and the phosphate salt includes $PO_4^{3-}$ — 52

Saturate rocks in the subterranean geologic formation with the solution for a duration of 1-24 hours, wherein the rocks include Austin chalk (AC), Indiana limestone (IL) or both — 54

Inject a liquid fractionating composition through the borehole into the subterranean geologic formation at a pressure of at least 1,000 psi to fracture the rocks in the subterranean geologic formation — 56

(56) References Cited

OTHER PUBLICATIONS

Xiang Chen, et al., "Enhancing fracture conductivity in carbonate formations through mineral alteration"; International Journal of Rock Mechanics and Mining Sciences, vol. 186, 106027, Feb. 1, 2025 (9 pages; excerpts only).

Yevgeniy Samarkin, et al., "In-situ micro-CT scanning and compressive strength assessment of diammonium hydrogen phosphate (DAP) treated chalk", Scientific Reports, vol. 13, Issue 1, Article No. 16806, Oct. 5, 2023 (10 pages).

* cited by examiner

METHOD OF IMPROVING ROCK HARDNESS IN SUBTERRANEAN GEOLOGIC FORMATION BY TRIPOTASSIUM PHOSPHATE

CROSS REFERENCE TO RELATED APPLICATIONS

The present disclosure claims the benefit of U.S. Provisional Application No. 63/775,103, filed on Mar. 20, 2025, which is incorporated herein by reference in its entirety. Aspects of the present disclosure are related to Applicant's co-pending Patent Application titled "METHOD OF IMPROVING ROCK HARDNESS IN SUBTERRANEAN GEOLOGIC FORMATIONS USING POTASSIUM DIHY-DROGEN PHOSPHATE", which is incorporated herein by reference in its entirety.

BACKGROUND

Technical Field

The present disclosure is directed to a method of enhancing rock hardness in a subterranean geologic formation, and more particularly, to a method of improving rock hardness in a subterranean geologic formation by chemically treating carbonate rocks with tripotassium phosphate.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Rock strength has a pivotal role in various geological formations and their long-term stability, including well bores, oil and gas reservoirs for efficient and economical resource exploitation, and the maintenance of historical monuments made of limestone. Stimulation operations used for subterranean geological formations aim to increase the productivity of resources by increasing the permeability of the formation matrix. Common stimulation operations include hydraulic fracturing, matrix acidizing, or acid-fracturing techniques. Hydraulic fracturing includes introducing a fracturing fluid at a high pressure to form conductive pathways, known as fractures, formed within the formation matrix. The performance of a fractured well is determined by the fracture conductivity, which is the product of the fracture's permeability and width. Proppants used for hydraulic fracturing maintain the fractures open even after release of hydraulic pressure. Additionally, matrix acidizing induces the generation of flow channels within the formation matrix, also known as wormholes, by dissolving some portions within the matrix. On the other hand, acid-fracturing techniques include the combination of hydraulic fracture and matrix acidizing for a subterranean formation. However, these aforementioned stimulation operations have several associated challenges, such as reduction of effective fracture width due to embedment of proppants within the fractures and weakening of the mechanical integrity of the formation matrix, leading to collapse of wormholes by matrix oxidation. In addition, stimulated operations also cause formation damage that decreases the hydrocarbon production due to a sub-optimal increase in permeability. Such formation damage is usually prevalent in subterranean formations including or dominated by carbonate minerals.

Therefore, continuous efforts are being put forward to design a promising method or strategy to harden the rock using chemical treatment. A successful method, including chemical treatment, is supposed to enhance rock strength to a desirable extent without damaging the matrix permeability. Efforts are directed to strengthen the rock hardness using various salts such as ammonium phosphate salt including diammonium hydrogen phosphate, ammonium dihydrogen phosphate and diammonium hydrogen phosphate that were promising to harden a carbonate mineral, provide resistant to high stresses and failure during drilling and production, strengthen the rock matrix due to increase in its compressive strength and elastic modulus, and induce high-porosity and high-permeability in the carbonate rocks. For commercial applications, the chemical agents are supposed to provide promising effects in certain aspects, such as enhancement in fracture conductivity, desirable mechanical strength, reduced toxicity, volatility emissions, risk of eutrophication, and environmental sustainability.

U.S. Pat. No. 12,071,590B2 discloses a method for hardening a carbonate mineral by introducing an ammonium phosphate salt into a subterranean formation containing a carbonate mineral, and interacting the carbonate mineral with the ammonium phosphate salt to convert at least a portion of the carbonate mineral into a hydroxyapatite mineral, $Ca10(PO4)6(OH)2$. The ammonium phosphate salt may be diammonium hydrogen phosphate or ammonium dihydrogen phosphate.

Chen et al. ("Enhancing fracture conductivity in carbonate formations through mineral alteration") disclose mineral alteration by in-situ transformation of existing minerals into harder minerals to improve rock strength. Diammonium hydrogen phosphate is a mineral alteration agent for high-porosity and high-permeability carbonate rocks at low temperatures. Diammonium hydrogen phosphate treatment improves rock strength.

Samarkin et al. ("In-situ micro-CT scanning and compressive strength assessment of diammonium hydrogen phosphate (DAP) treated chalk") use diammonium hydrogen phosphate as a chemical for strengthening chalk in hydrocarbon reservoirs to make it resistant to high stresses and failure during drilling and production. Diammonium hydrogen phosphate effectively strengthens the rock matrix, resulting in an increase in its compressive strength and elastic modulus compared to the untreated sample.

Although quite a few chemical agents have been developed in the past, each of the aforementioned methods for rock hardening using chemical treatment suffers from one or more drawbacks, hindering their adoption. Hence, there remains a requirement in the art for developing a method to improve rock hardness in a subterranean geologic formation capable of overcoming the aforementioned limitations, while simultaneously providing enhanced mechanical performance, environmental compatibility, and fracture conductivity during and after treatment. Accordingly, it is one object of the present disclosure to provide methods for chemically treating carbonate rocks using salt that can significantly enhance their hardness

SUMMARY

In an exemplary embodiment, a method of improving rock hardness in a subterranean geologic formation includes injecting a solution including a phosphate salt through a borehole into the subterranean geologic formation at a temperature of 50-90° C. and a pressure of 600-2000 psi, wherein the solution has a pH of 4 to 14 and a phosphate concentration of 0.5-2 mol/L, and the phosphate salt includes $PO_4^{3-}$, followed by saturating rocks in the subterranean geologic formation with the solution for a duration of 1-24 hours, wherein the rocks include Austin chalk (AC), Indiana limestone (IL) or both. The method then includes injecting a liquid fractionating composition through the borehole into the subterranean geologic formation at a pressure of at least 1,000 psi to fracture the rocks in the subterranean geologic formation.

In some embodiments, the phosphate salt is $K_3PO_4$. The solution consists of water and the phosphate salt.

In some embodiments, the temperature of the subterranean geologic formation during the injecting is 60-80° C.

In some embodiments, the method of injecting the solution is carried out at a pressure of 800-1500 psi.

In some embodiments, the rocks are saturated with the solution for 2-12 hours.

In some embodiments, the pH of the solution is from 12.6 to 14.

In some embodiments, the phosphate salt is $K_3PO_4$, the temperature of the subterranean geologic formation during the injecting is 70° C., the injecting the solution is carried out at a pressure of 1000 psi, the rocks are saturated with the solution for 4 hours, and the phosphate concentration of the solution is 1 mol/L.

In some embodiments, the pH of the solution is 12.6.

In some embodiments, the rocks include the AC.

In some embodiments, the injecting and the saturating increase a hardness of the AC by about 192%.

In some embodiments, the rocks include the IL.

In some embodiments, the method of injecting and the saturating increases a hardness of the IL by about 53%.

In some embodiments, the solution does not include a base or an acid other than the phosphate salt to adjust the pH of the solution.

In some embodiments, the liquid fractionating composition includes a carrier fluid consisting of water, oil or both; and a proppant including silica sand, ceramic proppants, resin-coated proppants or a combination thereof.

In some embodiments, the method includes recovering the liquid fractionating composition by allowing the liquid fractionating composition to flow back while leaving the proppant within the fractures.

In some embodiments, the method of recovering includes reducing a pressure within the borehole or injecting a nitrogen gas into the borehole.

In some embodiments, the method also includes executing a drainage process by injecting a drainage gas into the borehole to remove a portion of a formation fluid naturally present in the subterranean geologic formation.

In some embodiments, the drainage gas includes nitrogen.

In some embodiments, the pH of the solution is from 8 to 14, the rocks include the AC, and the injecting and the saturating increase a hardness of the AC by about 50%-300%.

In some embodiments, the pH of the solution is from 8 to 14, the rocks include the IL, and the method of injecting and the saturating increases the hardness of the IL by about 20%-100%.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
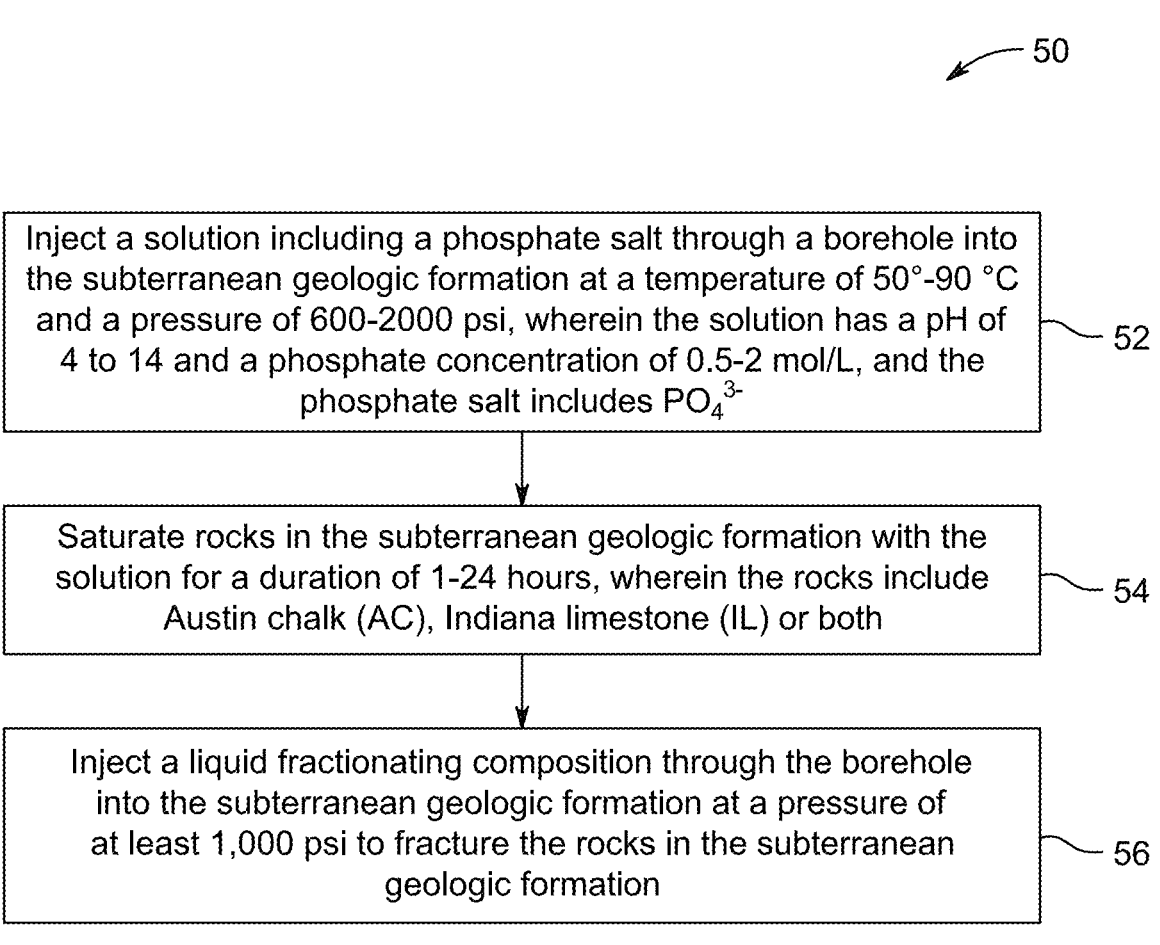
FIG. 1 is an exemplary flowchart illustrating a method of improving rock hardness in a subterranean geologic formation, according to certain embodiments.

In the drawings, like reference numerals designate identical or corresponding parts throughout the several views. Further, as used herein, the words "a," "an" and the like generally carry a meaning of "one or more," unless stated otherwise.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

Furthermore, the terms "approximately," "approximate," "about," and similar terms generally refer to ranges that include the identified value within a margin of 20%, 10%, or preferably 5%, and any values therebetween.

When amounts, concentrations, dimensions, and other parameters are expressed in the form of a range, a preferable range, an upper limit value, a lower limit value, or preferable upper and limit values, it should be understood that any ranges obtainable by combining any upper limit or preferable value with any lower limit or preferable value are also specifically disclosed, irrespective of whether the obtained ranges are clearly mentioned in the context.

In this application, a numerical value interval (i.e., a numerical value range) is involved, and, if not specifically stated, an optional numerical value distribution is considered continuous within the numerical value interval and includes two numerical value endpoints (i.e., minimum and maximum values) of the numerical value range and each numerical value between the two numerical value endpoints.

The temperature parameters in the present application, if not specifically limited, are both allowed to be constant temperature processing and allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

As used herein, the term 'room temperature' refers to a temperature range of '25 degrees Celsius (° C.)+5° C., preferably 25° C.±3° C., preferably 25° C. in the present disclosure.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

As used herein, the term "proppant" or 'proppants' includes particles mixed with a fracturing fluid to create and/or enlarge fractures in a subterraneous formation and remain in the fractures to hold the fractures open after recovering the fracturing fluid. For example in hydraulic fracturing, a hydraulic fluid containing proppants can be injected into a subterraneous formation and recovered by relieving the hydraulic pressure that is generated during hydraulic fracturing. A proppant is a granular material, most commonly sand, resin-coated sand, or manufactured ceramic. Proppants help in maintaining open fractures significantly, which improves fracture conductivity and thus hydrocarbon recovery.

As used herein, the term 'potassium phosphate tribasic' conforms to the formula of $K_3PO_4$ and is also known as tripotassium phosphate or tribasic potassium phosphate. 'Potassium phosphate tribasic monohydrate' conforms to the formula of $K_3PO_4 \cdot H_2O$.

As used herein, the concept of chemical consolidation in sandstone and other siliceous formations is based on the deposition of a mineral phase within the existing formation matrix, thereby binding individual rock grains together to strengthen or harden the formation matrix. In the present disclosure, chemical consolidation of carbonate formations may be achieved through alteration of the carbonate minerals by converting the carbonate mineral into a hardened mineral through a dissolution-precipitation reaction.

Aspects of this disclosure are directed to a method of improving rock hardness in a subterranean geological formation including carbonate reservoirs using chemical treatment of carbonate rocks with potassium phosphate tribasic monohydrate that can significantly enhance their hardness. For illustrative purposes, such treatment is applied to two rock samples: Austin chalk (AC) and Indiana limestone (IL).

Generally, stimulation operations (e.g., hydraulic fracturing) or inherent rock properties can lead to softening or mechanical weakness of carbonate formations. This causes problems such as proppant embedment (proppants sinking into soft rock) and weakened fracture asperities, reducing fracture conductivity and well productivity. Treatment of the subterranean geological formation via chemical consolidation to form a hydroxyapatite mineral according to the disclosure herein may improve the hardness of the subterranean formation, thereby decreasing proppant embedment and increasing the strength of the fracture asperities. The enhancement in rock hardness may also help address the issue of reduced fracture conductivity, thereby improving overall well productivity in carbonate formations. The present disclosure provides a method for treating the carbonate rock with potassium phosphate tribasic to convert carbonate minerals (e.g., $CaCO_3$) into a harder mineral phase (e.g., calcium hydroxyapatite, noted as $Ca_5(PO_4)_3OH$, $Ca_{10}(PO_4)_6(OH)_2$, Hap, Hap or HA). Such a method improves hardness and mechanical strength and is environmentally friendly due to reduced toxicity, volatility emissions, and risk of eutrophication since it contains no nitrogen to inflict such harms.

According to the embodiments consistent with the present disclosure, methods for hardening a carbonate mineral within a subterranean formation include introducing an aqueous carrier fluid including potassium phosphate tribasic monohydrate salt through a borehole into the subterranean formation including a carbonate reservoir; and interacting the carbonate mineral with the potassium phosphate tribasic monohydrate salt to convert at least a portion of the carbonate mineral into a hydroxyapatite mineral. The subterranean formation has an increased hardness after forming the hydroxyapatite mineral. Advantageously, the conversion of a carbonate mineral into a hydroxyapatite mineral may be accomplished over a short period of time under mild reaction conditions, as discussed hereinafter.

FIG. 1 illustrates a schematic flow chart of a method 50 of improving rock hardness in a subterranean geologic formation by chemically treating carbonate rocks using a potassium phosphate tribasic ($K_3PO_4$) solution. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes injecting a solution including a phosphate salt through a borehole into the subterranean geologic formation at a temperature of 50 to 90° C. and a pressure of 600 to 2000 psi, where the solution has a pH of 4 to 14 and a phosphate concentration of 0.5 to 2 mol/L, and the phosphate salt includes $PO_4^{3-}$.

In some embodiments, the phosphate salt may include monosodium phosphate, disodium phosphate, trisodium phosphate, monopotassium phosphate, dipotassium phosphate, tripotassium phosphate, ammonium phosphate, ammonium dihydrogen phosphate, diammonium hydrogen phosphate, dicalcium phosphate, monocalcium phosphate or any combinations thereof. Preferably, the phosphate salt may include monosodium phosphate, disodium phosphate, trisodium phosphate, monopotassium phosphate, dipotassium phosphate, tripotassium phosphate or any combinations thereof. In a preferred embodiment, the phosphate salt includes potassium phosphate salt such as monopotassium phosphate, dipotassium phosphate, tripotassium phosphate, or a combination thereof. In a preferred embodiment, the potassium phosphate salt used is potassium phosphate tribasic ($K_3PO_4$) or a monohydrate thereof.

The potassium phosphate salt including $PO_4^{3-}$ may convert the carbonate mineral (e.g., calcium carbonate) in the subterranean geologic formation into a hydroxyapatite mineral via a dissolution-precipitation reaction. Calcium hydroxyapatite has a Mohs hardness of 5 whereas calcium carbonate has a Mohs hardness of 3. Therefore, converting a carbonate mineral into a hydroxyapatite mineral may increase the hardness of the subterranean formation to facilitate strengthening thereof.

In some embodiments, the phosphate concentration of the solution (e.g. the concentration of $PO_4^{3-}$) is 0.5 to 2 mol/L, preferably 0.6 to 1.9 mol/L, preferably 0.7 to 1.8 mol/L, preferably 0.8 to 1.7 mol/L, preferably 0.9 to 1.6 mol/L, preferably 1.2 to 1.4 mol/L. In a preferred embodiment, the phosphate concentration of the solution is 1 mol/L.

In some embodiments, the temperature of the subterranean geologic formation while injecting the solution including the phosphate salt is 50° to 90° C., preferably 52° to 88° C., preferably 54° to 86° C., preferably 56° to 84° C., preferably 58° to 82° C., preferably 60° to 80° C., preferably 62° to 78° C., preferably 64° to 76° C., preferably 66° to 74° C., and preferably 68° to 72° C. In some embodiments, the temperature of the subterranean geologic formation while injecting the solution including the phosphate salt is 60 to 80° C., preferably 61° to 79° C., preferably 62° to 78° C., preferably 63° to 77° C., preferably 64° to 76° C., preferably 65° to 75° C., preferably 66° to 74° C., preferably 67° to 73° C., preferably 68° to 72° C., and preferably 69° to 71° C. In a preferred embodiment, the temperature of the subterranean geologic formation while injecting the solution, including the phosphate salt, is 70° C.

In some embodiments, the solution is injected into the subterranean geologic formation at an injection temperature of 50 to 90° C., preferably 52° to 88° C., preferably 54° to 86° C., preferably 56° to 84° C., preferably 58° to 82° C., preferably 60° to 80° C., preferably 62° to 78° C., preferably 64° to 76° C., preferably 66° to 74° C., and preferably 68° to 72° C. In a preferred embodiment, the injection temperature of the solution is 70° C.

In some embodiments, the method of injecting the solution is carried out at a pressure of 600 to 2000 psi, preferably 650 to 1950 psi, preferably 700 to 1900 psi, preferably 750 to 1850 psi, preferably 800 to 1800 psi, preferably 850 to 1750 psi, preferably 900 to 1700 psi, preferably 950 to 1650 psi, preferably 800 to 1500 psi, preferably 820 to 1480 psi, preferably 840 to 1460 psi, preferably 860 to 1440 psi, preferably 880 to 1420 psi, preferably 900 to 1400 psi, preferably 920 to 1380 psi, preferably 940 to 1360 psi, preferably 960 to 1340 psi, preferably 980 to 1320 psi, preferably 1100 to 1200 psi. In a preferred embodiment, the method of injecting the solution is carried out at a pressure of 1000 psi.

In some embodiments, the pH of the solution is from 4 to 14, preferably 4.1 to 13.9, preferably 4.2 to 13.8, preferably 4.3 to 13.7, preferably 4.4 to 13.6, preferably 4.5 to 13.5, and preferably 4.6 to 13.4, preferably 4.5 to 10, preferably 4.52 to 9.98, preferably 4.54 to 9.96, preferably 4.56 to 9.94, preferably 4.58 to 9.92, preferably 4.60 to 9.90, preferably 4.62 to 9.88, preferably 4.63 to 8, preferably 5 to 7.5, preferably 5.5 to 7.0, preferably 6.0 to 6.5. In a preferred embodiment, the pH of the solution is 12.6.

In some embodiments, the solution does not include a base or an acid other than the phosphate salt to adjust the pH of the solution, proppants, ammonium phosphate, ammonium dihydrogen phosphate or diammonium hydrogen phosphate. Alternatively, the solution may include a base (e.g. sodium hydroxide, potassium hydroxide, etc.) other than the phosphate salt, an acid (e.g. hydrochloric acid, sulfuric acid, etc.) other than the phosphate salt, proppants, ammonium phosphate, ammonium dihydrogen phosphate, diammonium hydrogen phosphate or any combinations thereof.

In some embodiments, the solution consists of water and one or more phosphate salts selected from the group consisting of monosodium phosphate, disodium phosphate, trisodium phosphate, monopotassium phosphate, dipotassium phosphate and tripotassium phosphate. Preferably, the solution consists of water and tripotassium phosphate, and optionally one or more phosphate salts selected from the group consisting of monosodium phosphate, disodium phosphate, trisodium phosphate, monopotassium phosphate and dipotassium phosphate. Preferably, the solution consists of water and tripotassium phosphate which has a concentration of 0.5 to 2 mol/L, preferably 0.7 to 1.8 mol/L, preferably 0.9 to 1.6 mol/L, preferably 1.2 to 1.4 mol/L.

At step 54, the method 50 includes saturating rocks in the subterranean geologic formation with the solution for a duration of 1 to 24 hours, wherein the rocks include Austin chalk (AC), Indiana limestone (IL), or both. The rocks are carbonate rock samples that contain significant amounts of carbonate minerals such as calcite ($CaCO_3$) and dolomite ($CaMg(CO_3)_2$). In some embodiments, the carbonate rock samples may be selected from limestone, dolostone, chalk, travertine, tufa, marl, coquina, fossiliferous limestone, and/or a combination thereof. The calcium carbonate may be in the form of limestone, chalk, marble, or any combination thereof. In a preferred embodiment, the carbonate rock samples used for treatment are AC and IL.

In some embodiments, the carbonate minerals may be present at a concentration of 45 wt. % to 99 wt. %, preferably 50 wt. % to 95 wt. %, preferably 60 wt. % to 90 wt. %, preferably 70 wt. % to 80 wt. %, based on a total weight of the rocks of the subterranean geologic formation. Particularly, calcium carbonate may be present at a concentration of 50 wt. % to 95 wt. %, preferably 60 wt. % to 90 wt. %, preferably 70 wt. % to 80 wt. % based on the total weight of the rocks of the subterranean geologic formation.

In some embodiments, the rocks are saturated with the solution for 1 to 24 hours, preferably 1.5 to 23.5 hours, preferably 2.0 to 23.0 hours, preferably 2.5 to 22.5 hours, preferably 3.0 to 22.0 hours, preferably 3.5 to 21.5 hours, preferably 5 to 19 hours, preferably 7 to 15 hours. In another embodiment, the rocks are saturated with the solution for 2 to 12 hours, preferably 2.2 to 11.8 hours, preferably 2.4 to 11.6 hours, preferably 2.6 to 11.4 hours, preferably 2.8 to 11.2 hours, preferably 3.0 to 11.0 hours, preferably 3.2 to 10.8 hours, preferably 3.4 to 10.6 hours, preferably 3.6 to 10.4 hours, preferably 3.8 to 10.6 hours, preferably 5 to 9 hours, preferably 6 to 8 hours. In a preferred embodiment, the rocks are saturated with the solution for 4 hours.

At step 56, the method 50 includes injecting a liquid fractionating composition through a borehole into a subterranean geologic formation at a pressure of at least about 1,000 psi, preferably 1,200 psi to 3,000 psi, preferably 1,500 psi to 2,500 psi, preferably 1,800 psi to 2,200 psi, so as to fracture the rocks within the formation.

In some embodiments, the liquid fractionating composition includes a carrier fluid selected from the group consisting of water, oil, and mixtures thereof, and a proppant selected from the group consisting of silica sand, ceramic proppants, resin-coated proppants, and combinations thereof. In certain embodiments, the carrier fluid consists essentially of water, oil, or mixtures thereof, and the proppant consists essentially of ceramic proppants, resin-coated proppants, or combinations thereof. In yet other embodiments, the carrier fluid consists of water, oil, or mixtures thereof, and the proppant consists of ceramic proppants, resin-coated proppants, or combinations thereof.

Following injection, in some embodiments, the method includes recovering at least a portion of the liquid fractionating composition by allowing the liquid fractionating composition to flow back through the borehole while leaving the proppant(s) substantially within the fractures in the subterranean geologic formation. In some embodiments, recovering the liquid fractionating composition includes reducing the pressure within the borehole and/or injecting nitrogen gas into the borehole.

In some embodiments, the method further includes executing a drainage process by injecting a drainage gas into the borehole to remove at least a portion of a formation fluid naturally present in the subterranean geological formation. In a preferred embodiment, the drainage gas includes nitrogen.

In some embodiments, for AC rocks, when the pH of the solution is from 8 to 14, preferably 8.1 to 13.9, preferably 8.2 to 13.8, preferably 8.3 to 13.7, preferably 8.4 to 13.6, preferably 8.5 to 13.5, preferably 8.6 to 13.4, preferably 8.7 to 13.3, preferably 8.8 to 13.2, preferably 8.9 to 13.1, preferably 9.0 to 13.0, preferably 9.1 to 12.9, preferably 9.2 to 12.8, and preferably 9.3 to 12.7, preferably 10 to 12.5. preferably 10.5 to 12, preferably 11 to 11.5, the method of injecting and saturating the AC rocks with the solution increases the hardness of the AC by about 50% to 300%, preferably about 60% to 290%, preferably about 70% to 280%, preferably about 80% to 270%, preferably about 90% to 260%, preferably about 100% to 250%, preferably about 110% to 240%, preferably about 120% to 230%, preferably about 130% to 220%, preferably about 140% to 210%, and preferably about 150% to 200%.

In a preferred embodiment, the phosphate salt is $K_3PO_4$, the temperature of the subterranean geologic formation during the injecting is 70° C., the injecting the solution is carried out at a pressure of 1000 psi, the rocks are saturated with the solution for 4 hours, and the phosphate concentration of the solution is 1 mol/L. For AC rocks, when the pH of the solution is 12.6, the method of injecting and saturating the AC rocks with the solution increases the hardness of the AC by about 192%, more specifically by about 192.11%.

In some embodiments, for IL rocks, when the pH of the solution is from 8 to 14, preferably 8.1 to 13.9, preferably 8.2 to 13.8, preferably 8.3 to 13.7, preferably 8.4 to 13.6, preferably 8.5 to 13.5, preferably 8.6 to 13.4, preferably 8.7 to 13.3, preferably 8.8 to 13.2, preferably 8.9 to 13.1, preferably 9.0 to 13.0, preferably 9.1 to 12.9, preferably 9.2 to 12.8, and preferably 9.3 to 12.7, preferably 10 to 12.5. preferably 10.5 to 12, preferably 11 to 11.5, the method of injecting and saturating the IC rocks with the solution increases a hardness of the IL by about 20% to 100%, preferably 25% to 95%, preferably 30% to 90%, preferably 35% to 85%, preferably 40% to 80%, preferably 45% to 75%, and preferably 50% to 75%.

In a preferred embodiment, the phosphate salt is $K_3PO_4$, the temperature of the subterranean geologic formation during the injecting is 70° C., the injecting the solution is carried out at a pressure of 1000 psi, the rocks are saturated with the solution for 4 hours, and the phosphate concentration of the solution is 1 mol/L. For IL rocks, when the pH of the solution is about 12.6, the method of injecting and saturating the IC rocks with the solution increases the hardness of the IL by about 53%, preferably by about 52.84%.

The following examples are provided solely for illustration and are not to be construed as limitations of the present disclosure, as many variations thereof are possible without departing from the spirit and scope of the present disclosure.

EXAMPLES

The following examples demonstrate a method of improving rock hardness, more particularly, of carbonate rocks, in a subterranean geologic formation using stimulation operations, including potassium phosphate tribasic monohydrate induced chemical consolidation of carbonate minerals within subterranean geologic formations. The examples are provided solely for illustration and are not to be construed as limitations of the present disclosure, as many variations thereof are possible without departing from the spirit and scope of the present disclosure.

Example 1: Experiment

Figure 2:
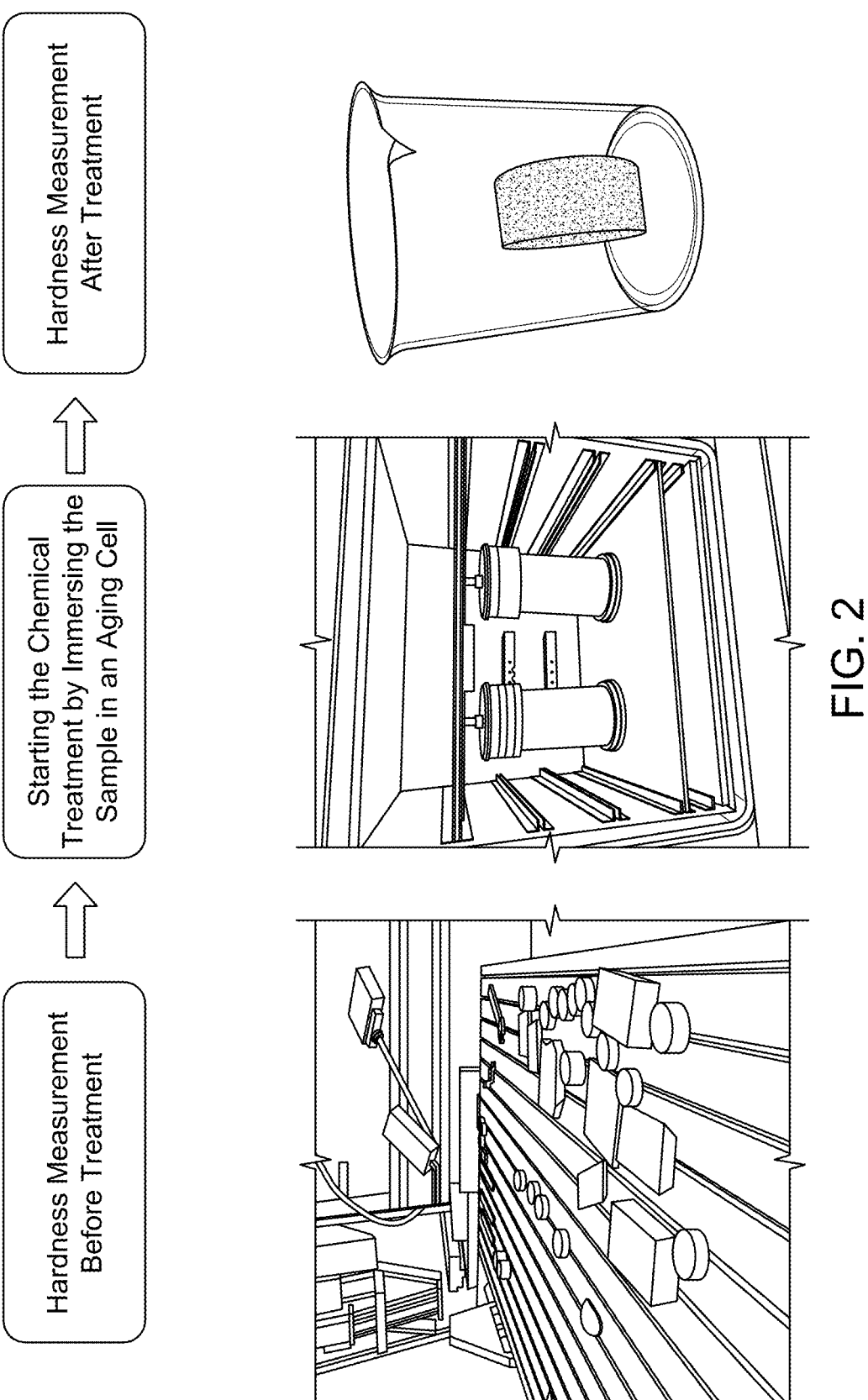
FIG. 2 shows the workflow of chemically treating carbonate rocks using a potassium phosphate tribasic monohydrate ($K_3PO_4 \cdot H_2O$) solution, according to certain embodiments.

The experiment involved chemically treating carbonate rocks using a potassium phosphate tribasic monohydrate ($K_3PO_4 \cdot H_2O$) solution. The treatment was applied to two rock samples: Austin chalk (AC) and Indiana limestone (IL). The core samples have a disc-shape (i.e., a cylindrical shape) with dimensions of 1.5 inches in diameter and 1.5 centimeters in thickness. The treatment process includes immersing the samples in an aging cell for 4 hours at 70° C. and 1000 psi in a solution consisting of water and 1 mol/L of potassium phosphate tribasic monohydrate with a pH of 12.6. The reaction between the solution and the calcium carbonate is shown in Equation (1). Hardness measurements were taken on dry samples at 10 different points (e.g. top and bottom), before and after the treatment using an impulse hammer auto scan device. The workflow is illustrated in FIG. 2.

$$10CaCO_3 + 6K_3PO_4 + 2OH^- \rightarrow Ca_{10}(PO_4)_6(OH)_2 + 9K_2CO_3 + CO_3^{2-} \quad (1)$$

Figure 3A:
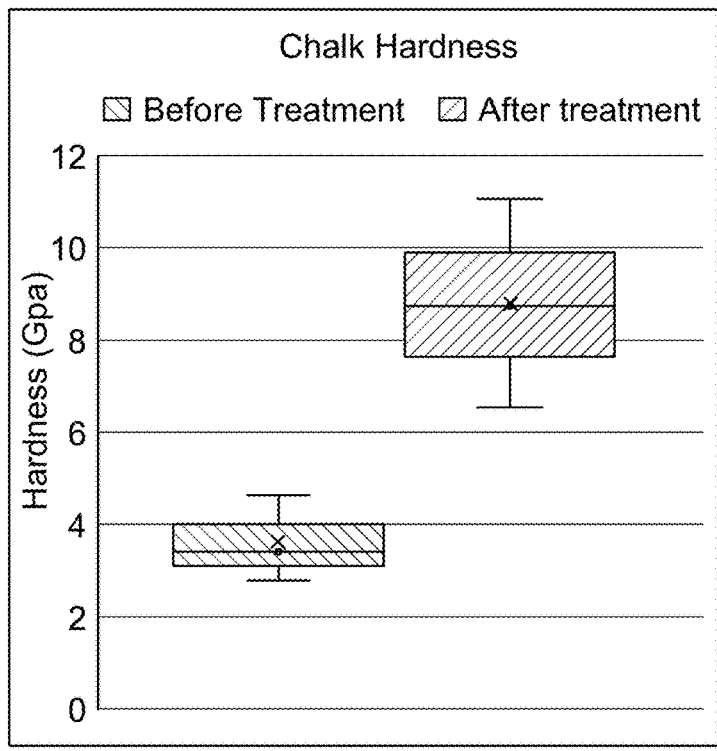
FIG. 3A shows the rock hardness of chalk samples before and after treatment using tribasic potassium phosphate, according to certain embodiments.
Figure 3B:
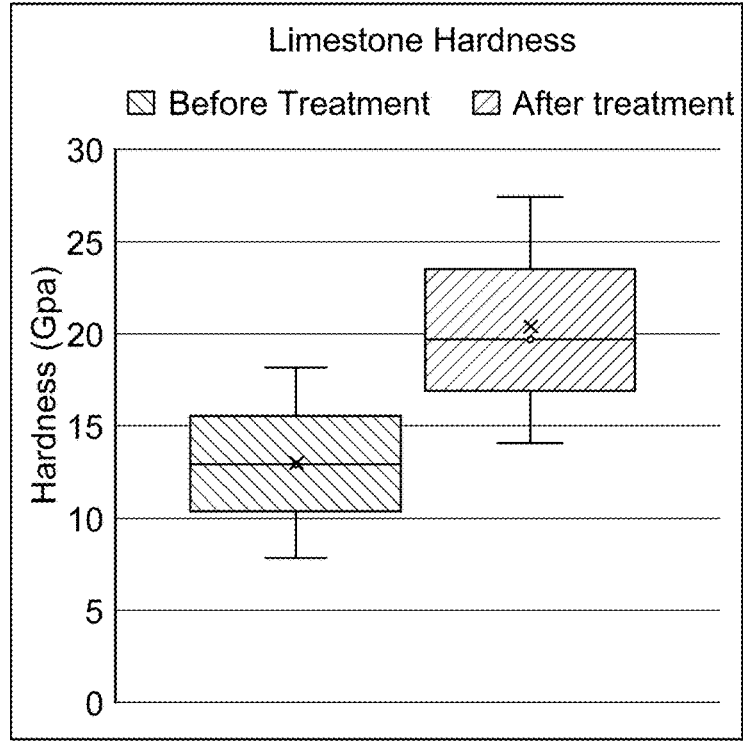
FIG. 3B shows the rock hardness of limestone samples before and after treatment using tribasic potassium phosphate, according to certain embodiments.

Table 1 shows that Chalk hardness has increased by 192% after treatment. While Table 2 shows that limestone hardness has increased by approximately 53%. It can be seen that the improvement of hardness in the Chalk sample is significantly larger than the improvement in the limestone sample, which means that potassium phosphate tribasic monohydrate has a greater impact on the chalk. FIGS. 3A and 3B show the rock hardness before and after treatment for both chalk and limestone samples.

TABLE 1

Austin chalk (AC) hardness before and after treatment
AC sample treated with $K_3PO_4$ solution

| | Side | | | |
| --- | --- | --- | --- | --- |
| | Top | | Bottom | |
| | Treatment | | | |
| | Before treatment | After treatment | Before treatment | After treatment |
| Minimal hardness (Gpa) | 1.35 | 4.71 | 4.22 | 8.35 |
| Maximal hardness (Gpa) | 2.68 | 7.77 | 6.57 | 14.34 |
| Average hardness (Gpa) | 1.73 | 6.29 | 5.04 | 11.13 |
| Improvement (%) | 263.34 | | 120.88 | |
| Average Improvement (%) | 192.11 | | | |

TABLE 2

Indiana limestone (IL) hardness before and after treatment
IL sample treated with $K_3PO_4$ solution

| | Side | | | |
| --- | --- | --- | --- | --- |
| | Top | | Bottom | |
| | Treatment | | | |
| | Before treatment | After treatment | Before treatment | After treatment |
| Minimal hardness (Gpa) | 7.86 | 14.13 | 7.90 | 14.03 |
| Maximal hardness (Gpa) | 16.98 | 27.67 | 19.43 | 27.12 |

TABLE 2-continued

| Indiana limestone (IL) hardness before and after treatment IL sample treated with $K_3PO_4$ solution | | | |
|---|---|---|---|
| | Side | | |
| | Top | | Bottom |
| | Treatment | | |
| Before treatment | After treatment | Before treatment | After treatment |
| Average hardness (Gpa) 13.24 | 20.47 | 12.60 | 19.03 |
| Improvement (%) 54.61 | | 51.07 | |
| Average Improvement (%) | 52.84 | | |

Figure 4:
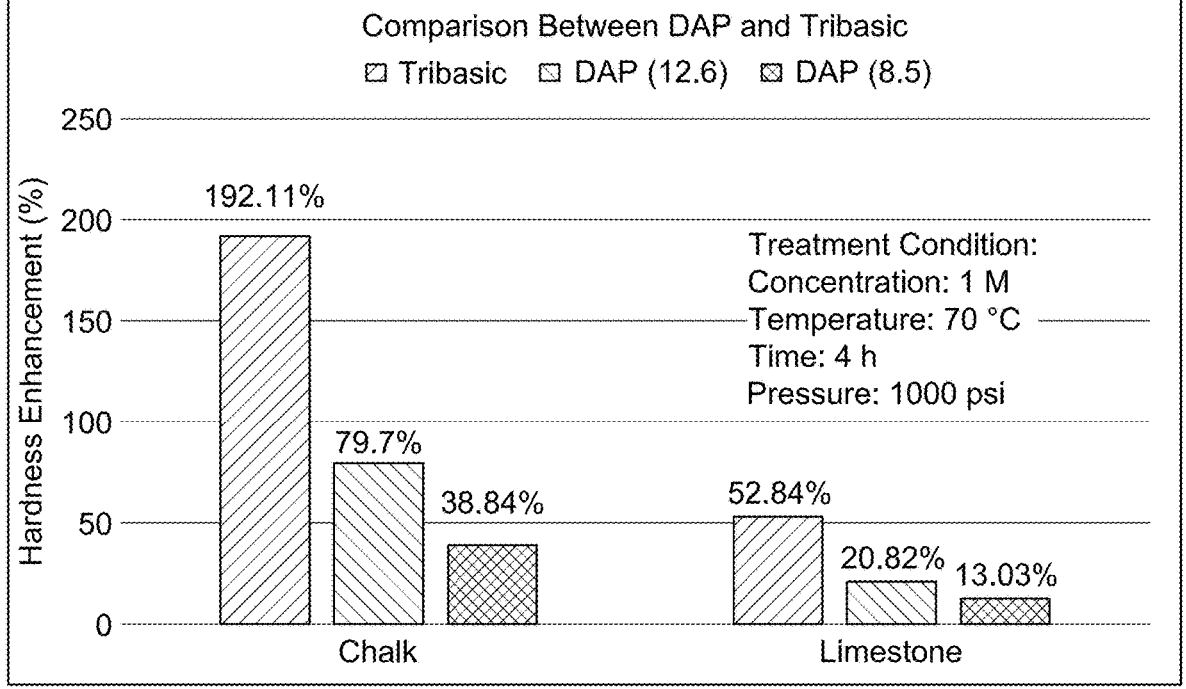
FIG. 4 shows the comparison of hardness enhancement by diammonium phosphate (DAP) and tribasic potassium phosphate, according to certain embodiments.

Under the same treatment conditions, 1M concentration, 70° C. temperature, 4-hour aging time, and 1000 psi pressure, FIG. 4 clearly demonstrates that tribasic potassium phosphate ($K_3PO_4$) significantly outperformed diammonium phosphate (DAP) in enhancing carbonate rock hardness. The $K_3PO_4$ solution used in FIG. 4 consists of water and 1 mol/L of $K_3PO_4$ and has a pH of 12.6. Two DAP solutions were used: one (a solution consisting of water and 1 mol/L of DAP) at its native pH (~8.5) and another (a solution consisting of water, NaOH and 1 mol/L of DAP) adjusted to match the pH of tribasic potassium phosphate (12.6).

In FIGS. 3A, 3B and 4, "tribasic" refers to $K_3PO_4$, "chalk" refers to AC, and "limestone" refers to IL. For AC, $K_3PO_4$ achieved a substantial 192.11% hardness increase, while DAP at pH of 12.6 and 8.5 resulted in 79.7% and 38.84% improvements, respectively. For IL, $K_3PO_4$ improved hardness by 52.84%, compared to 20.82% and 13.03% for DAP at pH of 12.6 and 8.5 respectively. These findings confirm the superior efficiency of $K_3PO_4$ in enhancing the mechanical integrity of carbonate rocks under identical conditions. In other words, $K_3PO_4$ is more effective than DAP at the same concentration with or without pH adjustment. Additionally, decomposition of DAP starts as low as 70° C. to produce hazardous decomposition products. Indeed, DAP gradually loses ammonia when exposed to air even at room temperature and decomposes to ammonia and monoammonium phosphate at around 70° C. Such gas release is not only environmentally unfriendly, but also potentially detrimental in rock hardening for example by increasing the internal pressure of the subterraneous formation, creating more fractures and damaging the rock matrix of the subterraneous formation. By contrast, there is no such risk of releasing a gas associated with $K_3PO_4$.

Table 3 highlights several differences between DAP and $K_3PO_4$ from the safety and environmental perspective. $K_3PO_4$ is more environmentally friendly compared to DAP in that $K_3PO_4$ has reduced toxicity, volatility emissions, and risk of eutrophication since it contains no ammonium or ammonia to inflict such harm.

TABLE 3

| DAP vs. $K_3PO_4$: Safety and Environmental Comparison | | |
|---|---|---|
| Feature | Diammonium Hydrogen Phosphate (DAP) | Potassium Phosphate Tribasic ($K_3PO_4$) |
| Volatile Emissions | Ammonia ($NH_3$) is released → odor, potential health hazard | None under typical lab or field conditions |

TABLE 3-continued

| DAP vs. $K_3PO_4$: Safety and Environmental Comparison | | |
|---|---|---|
| Feature | Diammonium Hydrogen Phosphate (DAP) | Potassium Phosphate Tribasic ($K_3PO_4$) |
| Toxicity (Aquatic) | Moderate, mostly from ammonia generation in water | Low toxicity; potassium is less problematic environmentally |
| Environmental Fate | Can contribute to eutrophication via ammonia or phosphate runoff | Also a phosphorus source, but no nitrogen → less eutrophication potential |
| Health & Safety | Risk of ammonia inhalation above 70° C.; irritation to eyes/respiratory system | Less volatile, corrosive at high pH but safer at thermal level |
| Decomposition Products | $NH_3$ and $H_3PO_4$ or $NH_4H_2PO_4$ intermediates | Inert under normal thermal conditions |

Numerous modifications and variations of the present disclosure are possible in light of the above teachings. It is therefore to be understood that within the scope of the appended claims, the invention may be practiced otherwise than as specifically described herein.

The invention claimed is:

1. A method of improving rock hardness in a subterranean geologic formation, comprising:
   injecting a solution comprising a phosphate salt through a borehole into the subterranean geologic formation at a temperature of 50-90° C. and a pressure of 600-2000 psi, wherein the solution has a pH of 4 to 14 and a phosphate concentration of 0.5-2 mol/L, and the phosphate salt includes $PO_4^{3-}$;
   saturating rocks in the subterranean geologic formation with the solution for a duration of 1-24 hours, wherein the rocks include Austin chalk (AC), Indiana limestone (IL) or both; then
   injecting a liquid fractionating composition through the borehole into the subterranean geologic formation at a pressure of at least 1,000 psi to fracture the rocks in the subterranean geologic formation.

2. The method of claim 1, wherein:
   the phosphate salt is $K_3PO_4$, and the solution consists of water and the phosphate salt.

3. The method of claim 1, wherein:
   the temperature of the subterranean geologic formation during the injecting is 60-80° C.

4. The method of claim 1, wherein:
   the injecting the solution is carried out at a pressure of 800-1500 psi.

5. The method of claim 1, wherein:
   the rocks are saturated with the solution for 2-12 hours.

6. The method of claim 1, wherein:
   the pH of the solution is from 12.6 to 14.

7. The method of claim 6, wherein:
   the phosphate salt is $K_3PO_4$,
   the temperature of the subterranean geologic formation during the injecting is 70° C.,
   the injecting the solution is carried out at a pressure of 1000 psi,
   the rocks are saturated with the solution for 4 hours, and
   the phosphate concentration of the solution is 1 mol/L.

8. The method of claim 7, wherein:
   the pH of the solution is 12.6.

9. The method of claim 8, wherein:
   the rocks include the AC.

10. The method of claim 9, wherein:
   the injecting and the saturating increase a hardness of the AC by about 192%.

11. The method of claim 8, wherein:

the rocks include the IL.

12. The method of claim 11, wherein:

the injecting and the saturating increase a hardness of the IL by about 53%.

13. The method of claim 1, wherein:

the solution does not include a base or an acid other than the phosphate salt to adjust the pH of the solution.

14. The method of claim 1, wherein the liquid fractionating composition comprises:

a carrier fluid including water, oil or both; and a proppant including silica sand, ceramic proppants, resin-coated proppants or a combination thereof.

15. The method of claim 1, further comprising:

recovering the liquid fractionating composition by allowing the liquid fractionating composition to flow back while leaving the proppant within the fractures.

16. The method of claim 15, wherein:

the recovering comprises reducing a pressure within the borehole or injecting a nitrogen gas into the borehole.

17. The method of claim 1, further comprising:

executing a drainage process by injecting a drainage gas into the borehole to remove a portion of a formation fluid naturally present in the subterranean geologic formation.

18. The method of claim 17, wherein:

the drainage gas comprises nitrogen.

19. The method of claim 1, wherein:

the pH of the solution is from 8 to 14, the rocks include the AC, and the injecting and the saturating increase a hardness of the AC by about 50%-300%.

20. The method of claim 1, wherein:

the pH of the solution is from 8 to 14, the rocks include the IL, and the injecting and the saturating increase a hardness of the IL by about 20%-100%.

* * * * *